United States Patent [19]

Holland

[11] Patent Number: 4,478,640

[45] Date of Patent: Oct. 23, 1984

[54] WELL TREATING PROCESS AND COMPOSITION

[75] Inventor: Ann C. Holland, Casper, Wyo.

[73] Assignee: The Dow Chemical Company, Midland, Mich.

[21] Appl. No.: 588,251

[22] Filed: Mar. 12, 1984

Related U.S. Application Data

[62] Division of Ser. No. 461,423, Jan. 27, 1983.

[51] Int. Cl.[3] ............................................. C04B 7/353
[52] U.S. Cl. .................................... 106/76; 106/81; 106/93
[58] Field of Search .............................. 106/76, 81, 93

[56] References Cited

U.S. PATENT DOCUMENTS

3,959,003  5/1976  Ostroot et al. .................. 106/93
4,050,948  9/1977  Gandy et al. .................... 106/76

*Primary Examiner*—James Poer

[57] ABSTRACT

A process for treating a subterranean zone by emplacing therein a hardenable aqueous slurry and then permitting the slurry to harden, where the slurry comprises a hydraulic cement, water, sodium bentonite, sodium metasilicate, and a hydroxyethyl cellulose.

The composition and process employing same is particularly useful in the treatment of oil and gas wells where cementing of a weak formation or very long string cementing, in a single stage, is desired.

18 Claims, No Drawings

WELL TREATING PROCESS AND COMPOSITION

CROSS-REFERENCE TO RELATED APPLICATION

This application is a divisional of copending application Ser. No. 461,423 which was filed on Jan. 27, 1983.

BACKGROUND OF THE INVENTION

The invention pertains to a process for treating subterranean zones, particularly oil and gas wells where incompetent or weak formations are encountered, with lightweight, aqueous hydraulic cement slurry and a composition useful in this process. In cementing particularly long strings of pipe in a wellbore, i.e., one or two thousand feet or more, it is often necessary to perform the cement job in multiple stages because the excessive weight of the long column of cement slurry would fracture the subterranean formation.

Cement slurries comprising hydraulic cements, bentonite and large amounts of water have been employed in well cementing where a lightweight slurry is desired. Sodium metasilicate has also been employed in cement slurries in well cementing. Cellulose derivates have likewise been employed in well cement slurries in the past.

In order to cement long strings of pipe, oil and gas producers have previously resorted to multiple-stage cement jobs with resultant extended lost rig time or have used more expensive additives such as glass or ceramic microbubbles to lighten cementing slurries. Previous water-extended lightweight slurries employing bentonite or sodium metasilicate have generally suffered from poor performance due to excessive free water content or lack of reasonable setting time or ultimate strength.

SUMMARY OF THE INVENTION

A process for treating subterranean zone by emplacing therein a hardenable, aqueous slurry and thereafter permitting said slurry to harden, where the slurry comprises a hydraulic cement, and based on 100 parts of said cement by weight:
  A. about 150 to about 250 parts water;
  B. about 10 to about 15 parts sodium bentonite;
  C. about 0.5 to about 1.5 part sodium metasilicate;
  D. about 0.5 to about 1.5 part of a hydroxyethyl cellulose.

While the individual components have previously been used in well cement applications, it is critical that the components mentioned above all be present within the designated ranges or a slurry having acceptable properties for "long-string" cementing applications will not be obtained. Such a slurry preferably has a weight of between about 10 and about 12 pounds per gallon in order to form an acceptable fluid for the treatment in weaker subterranean formations or in applications where a long column of cement slurry will be emplaced in a single operation. Utilizing the process and slurry of the invention, long-string cementing jobs may be performed and circulation of cement slurry in the annulus between the tubing and the wall of the borehole may be obtained, even back to the surface from a depth of several thousand feet.

Preferably, an aqueous slurry is employed having a weight between about 10.5 and about 11.5 pounds per gallon and preferably a free water content, as determined by American Petroleum Institute (API) standards, of less than about 10 ml.

DETAILED DESCRIPTION OF THE INVENTION

The process of the invention is suitably performed with standard oil field equipment used for pumping cement slurries into boreholes of subterranean formations. The lightweight cement slurry of the instant invention is also prepared using standard oilfield cement blending and mixing equipment by first combining all dry additives with the finely divided hydraulic cement component, combining any liquid additives with the mix water to be employed and then mixing the dry components with the so blended liquid components to obtain the slurry.

The hydraulic cement component is a cementitious material which typically is a mineral material which when wetted with water changes from a finely or coarsely divided material into a continuous hardened material. Portland cements, alumina cements and pozzolan cements are representative. Portland cement is preferred for utilization in the present invention particularly those Portland cements known as API class G and class H cements. Unless otherwise specified, all quantities related to the composition of the resulting cement slurry are in parts by weight and based upon 100 parts of the hydraulic cement component.

In formulating the cement slurry of the invention, about 150 to about 250 parts water will be added to the hydraulic cement. Preferably, an amount of water sufficient to yield a resultant aqueous slurry having a weight of between about 10 and about 12, more preferably between about 10.5 and about 11.5 pounds per gallon is employed. More preferably, about 180 to about 220 parts water are employed per 100 parts of the hydraulic cement.

Component B of the invention slurry, which is utilized in amounts of between about 10 and about 15 parts and preferably between about 11 and about 14 parts per 100 parts hydraulic cement, is a finely divided, water-swellable material known as bentonite. It is comprised primarily of the clay montmorillonite. Since it is desired that the bentonite take up and hold a large quantity of the water in the cement slurry, it is preferably used mainly in the sodium form. This form has a high swelling capacity in water while the calcium form of bentonite does not swell appreciably in water. The sodium form of bentonite is generally known as Wyoming or Western bentonite. It is commonly used in the oilfield, and preferably meets API specification 10 requirements.

Component C of the invention slurry, employed in amounts from about 0.5 to about 1.5 part per 100 parts cement is sodium metasilicate. Sodium metasilicate is available both in the anhydrous and pentahydrate forms. Since the anhydrous form has a higher bulk density and is therefore more economical to handle, it is preferred for use in the present invention. The amounts of sodium metasilicate expressed herein refer to the anhydrous basis and where the pentahydrate form is utilized, a correspondingly greater amount would be employed to account for the lower bulk density thereof. Preferably, about 0.75 to about 1.25 part is employed and most preferably about 1 part is employed per 100 parts cement in the invention slurry.

Component D, in the amount of about 0.5 to about 1.5 part, is a hydroxyethyl cellulose. Numerous hydroxyethyl cellulose products are available on the market having varying degrees of molar substitution and available in different molecular weights. The term hydroxyethyl cellulose, as employed herein, is also meant to include those hydroxyethyl celluloses which bear methoxy substituents on at least some of the active hydroxyl sites of the cellulose molecule and which are commonly known as hydroxyethyl methylcellulose or HEMC. Since the absolute molecular weights of such hydroxyethyl celluloses are difficult to determine, relative molecular weights are generally expressed in terms of the viscosity generated at a given temperature for an arbitrary concentration of the polymer in an aqueous solution. Preferred for use in the instant invention are hydroxyethyl celluloses having about 2.5 moler substitution. Also preferred in the invention are hydroxyethyl celluloses which bear no methoxy substituents and which exhibit, at 25° C., a Brookfield viscosity of between about 25 and about 400 centipoise (cps) at a 2% concentration in fresh water.

The amount of Component D employed in the instant slurries is preferably between about 0.75 and about 1.25 part, more preferably about 1 part per 100 parts cement. However, when the higher molecular weight hydroxyethyl celluloses are to be employed in the instant invention it may be desirable to utilize less than it would be if the hydroxyethyl cellulose were of lower molecular weight. Accordingly, if the amount of a hydroxyethyl cellulose to be employed in the instant invention should render the resulting slurry thicker than is desirable for easy pumping under downhole conditions, then the amount of the hydroxethyl cellulose may be decreased. Usually the amount of sodium metasilicate in Component C may then be correspondingly increased in order to avoid a slurry having excess free water. Conversely, where the slurry exhibits very low free water content but is thicker than desired, the amount of sodium silicate may be reduced and the amount of the hydroxyethyl cellulose employed may be increased.

In addition to the foregoing required components, other standard oil well cement slurry additives may be included. It is preferable, however, to avoid addition of organic dispersants such as sulfonated polyaromatic compounds and sulfonated lignins since these tend to destroy the water retention capability of the required components of the slurry. However, other standard oilfield cement additives such as accelerators, retarders and extenders such as gilsonite or pulverized coal, silica flour or silica powder (e.g., diatomaceous earth) may optionally be included in the cement slurry.

In one preferred mode of the invention, up to about 10% sodium chloride may be incorporated in the mix water, based upon the weight of water. Preferably, from about 1 to 5% and more preferably about 3% sodium chloride, is included in the water to yield a "salt water" cement systems.

In another preferred embodiment of the invention, up to about 15 parts, based upon 100 parts cement, of gilsonite, ground coal, silica flour, or diatomaceous earth is incorporated in the cement slurry. In another preferred embodiment of the invention, the hydraulic cement component is comprised of a 50:50 mixture of Portland cement and a pozzolanic flyash material. Most preferably, the aqueous slurries of the invention exhibit an API free water content of about 7 ml or less, more preferably about 3.5 ml or less and most preferably about 2 ml or less.

SPECIFIC EMBODIMENTS OF THE INVENTION

Example 1

A cement slurry is prepared by combining 100 parts Class G cement with about 12 parts sodium bentonite, 1 part sodium metasilicate and 0.75 part hydroxyethyl cellulose having a molar substitution of about 2.5 and exhibiting a Brookfield viscosity of between about 200 to 400 centipoise at 25° C. as a 2% aqueous solution. This dry mixture of components is thoroughly blended and then added to about 210 parts fresh water with vigorous mixing. Upon testing the resultant slurry according to API specifications for free water, 0 ml of free water is observed. When this slurry is tested according to API specifications after 72 hours at 88° C., a compressive strength of 320 psi is observed.

Example 2

The slurry of Example 1 is prepared but to the 210 parts water is added 3%, based on weight of water, sodium chloride. This slurry exhibits 8 ml free water and has a compressive strength of about 500 psi after 72 hours at 88° C.

Example 3

The slurry of Example 2 is again prepared except that the amount of the hydroxyethyl cellulose component is raised from 0.75 part to 1 part. The slurry exhibits a free water content of 3 ml.

Example 4

To 100 parts of a 50:50 mixture of Class G cement and flyash is added 12 parts sodium bentonite, 1 part sodium silicate, and 1 part of the hydroxyethyl cellulose mentioned in the preceding examples. An additional 10 parts of acid washed diatomaceus earth, a finely powdered silica, is added to the dry mixture. This is blended with about 210 parts water and gives a compressive strength nearly twice that of the slurry of Example 1 in only 24 hours rather than 72 hours.

Example 5

When any one of the sodium bentonite, the sodium silicate, or the hydroxyethyl cellulose is omitted from the formulation of Example 1, an API free water of 10 ml or more is noted in the resulting slurries.

Example 6

A slurry is prepared in the fashion of Example 1 except that about 1 part of a hydroxyethyl methylcellulose (HEMC) is substituted for the hydroxyethyl cellulose of that example. The hydroxyethyl methylcellulose has about 0.2 methoxyl degree of substitution and about 2.4 hydroxyethyl molar substitution. A 2% aqueous solution of the HEMC at about 25° C. has a Brookfield viscosity between about 600 and 725 centipoise (60 and 30 RPM). The resulting slurry exhibits about 2 ml API free water content.

Example 7

A slurry of the invention formulated as described in Example 1 is pumped down 12,000 feet of tubing in a borehole and up the annulus formed between this tubing and the face of the borehole until cement returns are seen at the surface. In this fashion, a long casing cementing job is performed in a single stage where it ordinarily requires the added expense of multiple stages with conventional slurries. A bond log is performed on casing cemented with the aforementioned slurry and shows good to excellent bonding. Bond logs from cement jobs performed in the same area using other available lightweight systems show poor cement bonding.

What is claimed is:

1. An aqueous hydraulic cement slurry adapted for emplacement in subterranean formations and being relatively light in weight which comprises a hydraulic cement and, based on 100 parts by weight of said cement:
   A. about 150 to about 250 parts water;
   B. about 10 to about 15 parts sodium bentonite;
   C. about 0.5 to about 1.5 part sodium metasilicate;
   D. about 0.5 to about 1.5 part of a hydroxyethyl cellulose.

2. An aqueous hydraulic well cement slurry which comprises a hydraulic cement and, based on 100 parts of said cement:
   A. about 210 parts water;
   B. about 12 parts sodium bentonite;
   C. about 1 part sodium metasilicate;
   D. about 1 part of a hydroxyethyl cellulose; wherein the hydraulic cement comprises a Portland cement.

3. The slurry of claim 2 wherein the hydraulic cement further comprises a pozzolan.

4. The slurry of claim 1 wherein the aqueous slurry has a weight of between about 10.5 and about 11.5 pounds per gallon.

5. The slurry of claim 1 wherein the aqueous slurry has an API free water content of about 7 ml or less.

6. The slurry of claim 1 wherein Component (D) is a hydroxyethyl cellulose having a molar substitution of about 2.5.

7. The slurry of claim 1 wherein the hydraulic cement comprises Portland cement.

8. The slurry of claim 7 wherein the hydraulic cement further comprises a pozzolan.

9. The slurry of claim 7 wherein the hydraulic cement comprises about a 50:50 blend, by weight, of Portland cement and flyash.

10. The slurry of claim 1 wherein about 1 to about 5 percent sodium chloride is present in the slurry, based on the weight of water present.

11. The slurry of claim 1 wherein about 180 to about 220 parts water are present.

12. The slurry of claim 11 wherein about 1 part Component (C) and about 1 part Component (D) are present.

13. The slurry of claim 12 wherein about 1 to about 5 percent sodium chloride is present in the slurry, based on the weight of water present.

14. The slurry of claim 13 whererein the hydraulic cement comprises Portland cement.

15. The slurry of claim 14 wherein the hydraulic cement further comprises a pozzolan.

16. The slurry of claim 15 wherein the hydraulic cement comprises about a 50:50 blend, by weight, of Portland cement and flyash.

17. The slurry of claim 1 wherein the aqueous slurry has a weight of between about 10 and about 12 pounds per gallon and an API free water content of about 7 ml or less, the hydraulic cement comprises about a 50:50 blend, by weight, of Portland cement and a pozzolan and the aqueous slurry is emplaced in the subterranean zone by pumping it down tubing situated in a borehole into said zone and into an annulus formed between the outside of said tubing and the face of said borehole, at least until some of the slurry is returned to surface from the zone, and thereafter permitting the emplaced slurry to harden.

18. The slurry of claim 1 wherein the hydraulic cement comprises Portland cement; about 180 to about 220 parts water; about 10 to about 15 parts sodium bentonite; about 0.75 to about 1.25 part sodium metasilicate and about 0.75 to about 1.25 part of a hydroxyethyl cellulose are present in the slurry.

* * * * *